Oct. 27, 1936.    A. O. BECKMAN ET AL    2,058,761
APPARATUS FOR TESTING ACIDITY
Filed Oct. 12, 1934    2 Sheets-Sheet 1
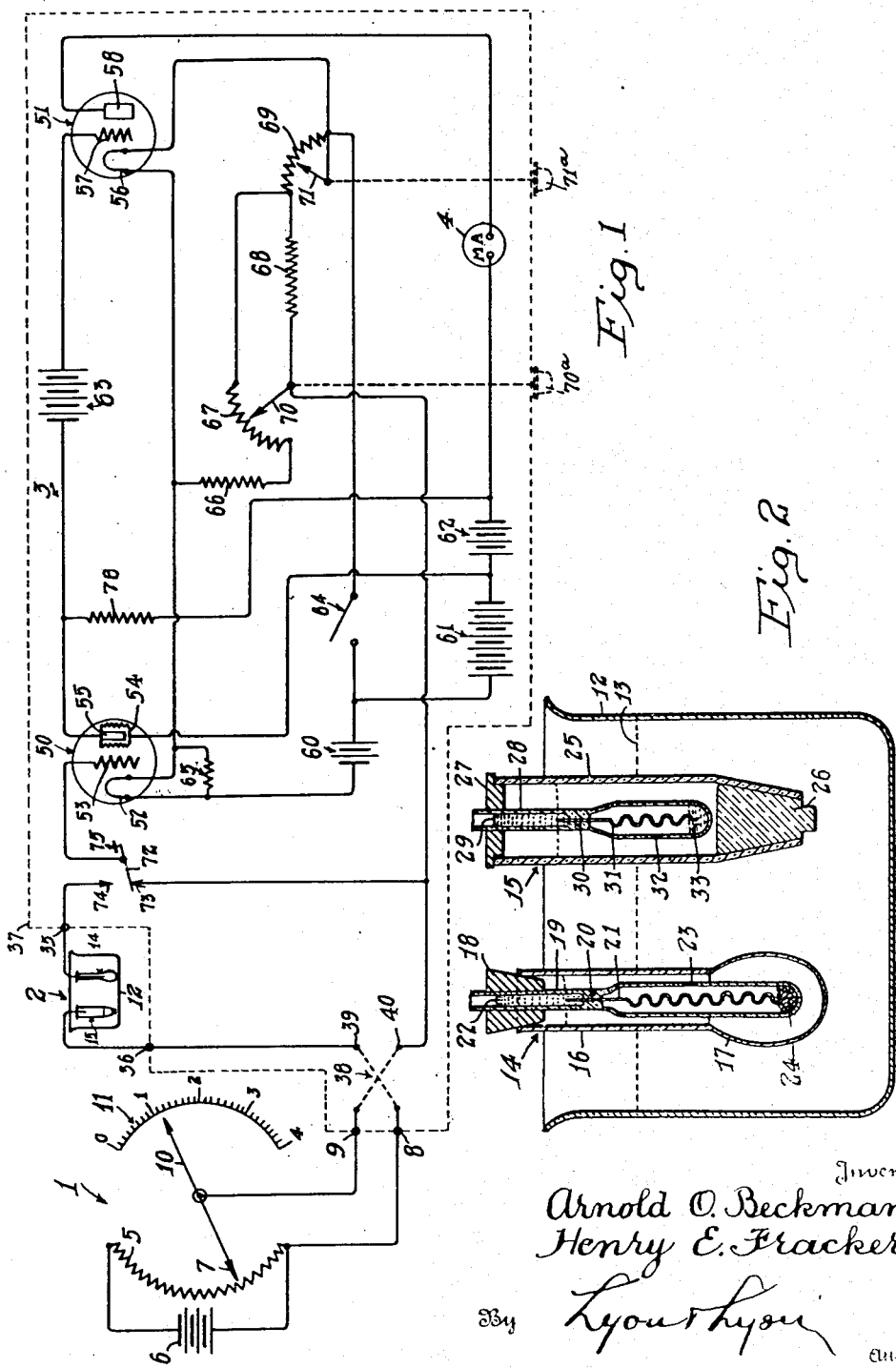
Inventors
Arnold O. Beckman
Henry E. Fracker
By Lyon & Lyon
Attorneys Oct. 27, 1936.  A. O. BECKMAN ET AL  2,058,761
APPARATUS FOR TESTING ACIDITY
Filed Oct. 12, 1934  2 Sheets-Sheet 2

Inventors
Arnold O. Beckman
Henry E. Fracker

By Lyon & Lyon
Attorneys

Patented Oct. 27, 1936

2,058,761

UNITED STATES PATENT OFFICE 2,058,761

APPARATUS FOR TESTING ACIDITY

Arnold O. Beckman, Altadena, and Henry E. Fracker, Pasadena, Calif., assignors, by mesne assignments, to National Technical Laboratories, Pasadena, Calif., a corporation of California Application October 12, 1934, Serial No. 748,048

10 Claims. (Cl. 175—183)

This invention relates broadly to electrical measuring instruments and has particular application in the measurement of potentials in circuits of extremely high resistance. A specific field in which it has great utility is in the determination of the hydrogen ion concentration (or pH as it is commonly termed) of solutions. The invention will therefore be described with particular reference to its application in pH determination.

A broad object of the invention is to provide a potential indicating device of extreme sensitivity that is also portable, mechanically rugged, simple and substantially fool-proof in operation and relatively inexpensive to construct and operate as compared with prior apparatus for the same purpose.

A further object is to provide means for measuring the potential of a high resistance circuit involving a voltaic cell in such a manner as to accomplish, first, the elimination of polarization effects at the electrodes of the cell, and second, reduce to a negligible value the potential drop caused by the measuring current in the circuit being tested.

A further object is to provide in a vacuum tube amplifier a circuit which shall be relatively insensitive to small variations of battery voltages and to further provide a simple means for compensating for large changes of battery voltages whereby battery potentials may drop to as low as two thirds of their initial value without affecting the operation of the system.

The general principles involved in hydrogen ion concentration tests are well known. One of the most satisfactory methods of procedure is to insert two electrodes of special characteristics in the solution to be tested and measure the potential between the electrodes. One of the electrodes may consist of a thin-walled glass bulb containing a solution of hydrochloric acid and quinhydrone of known characteristics and the other electrode may consist of a tube containing a solution of potassium chloride and mercurous chloride (calomel), the construction of the tube being such as to permit contact between the solution of potassium chloride and calomel within the tube, and the solution to be tested. It has been found that the thin wall of the glass bulb constituting a part of the first electrode allows electricity to flow between the known solution in the bulb and the solution to be tested surrounding the bulb, although preventing intermixing of the two solutions. The apparatus acts as a voltaic cell developing a potential which is a function of the pH of the solution being tested so that the pH can be determined to a high degree of accuracy if the potential of the cell can be measured accurately.

Great difficulty has heretofore been experienced in accurately measuring the potential of such a cell because of its enormous internal resistance. This resistance is, of course, due to the glass wall of the bulb, through which all current generated in the cell must flow. If an attempt is made to measure the potential of the cell by connecting an ordinary voltmeter directly thereto, the current supplied is insufficient to give a reading. Therefore, it has been the custom to connect the cell in series with a potentiometer (the potentiometer constituting a variable calibrated voltage source) and a delicate galvanometer, adjusting the potentiometer until it supplies a potential equal and of opposite polarity to that of the cell, the condition of balance being indicated by a zero reading on the galvanometer, and then noting the potential for which the potentiometer is set. The accuracy of this method depends in a large measure upon the sensitivity of the galvanometer employed, and unfortunately galvanometers that are sufficiently sensitive to give satisfactory results are so delicate that it is impracticable to attempt their use outside of special laboratories. Furthermore, even with the most sensitive galvanometers the glass bulb of the measuring cell must either be relatively large or its walls made exceedingly thin in order to pass sufficient current to give an accurate reading of the galvanometer. Large bulbs are objectionable because a large sample of the liquid to be tested is required in which to submerge the bulb. Obviously in many instances, such as in blood analysis for example, it is undesirable to take a large sample. Excessively thin-walled bulbs are objectionable because of the difficulty and expense of producing them and their fragility in use.

Attempts have previously been made to increase the sensitivity of the apparatus by employing a vacuum tube amplifier ahead of the galvanometer but, to the best of our knowledge, the resultant apparatus still had serious limitations. Thus it still employed a sensitive galvanometer, subject to mechanical or electrical damage if not handled with great care, and employed specially constructed vacuum tubes, expensive and not always readily obtainable. It was also necessary with the previous apparatus employing vacuum tubes to provide current sources of very constant potential to avoid drifts in the readings of the indicating instrument which seriously reduced the accuracy of measurement and necessitated frequent adjustments of the instrument. Furthermore, the sensitivity of the instrument was greatly affected by slight changes in the battery potentials. The means for maintaining constant potentials were inherently bulky.

In accordance with the present invention, we substitute for the delicate and fragile galvanometer, previously considered necessary, a simple and mechanically rugged milliammeter in combination with a specially designed vacuum tube amplifier employing standard radio tubes and energized from dry cells. The entire apparatus can be housed in a compact portable case, it is extremely accurate and is substantially foolproof in operation so that it can be manipulated by unskilled operators without danger of it being ruined or being thrown out of adjustment.

A full understanding of the invention may be had from the following detailed description which refers to the drawings.

In the drawings:

Fig. 1 is a schematic diagram showing the circuit employed in our apparatus;

Fig. 2 is a detail sectional view of a voltaic cell of the type adapted for use in our apparatus;

Figure 3:
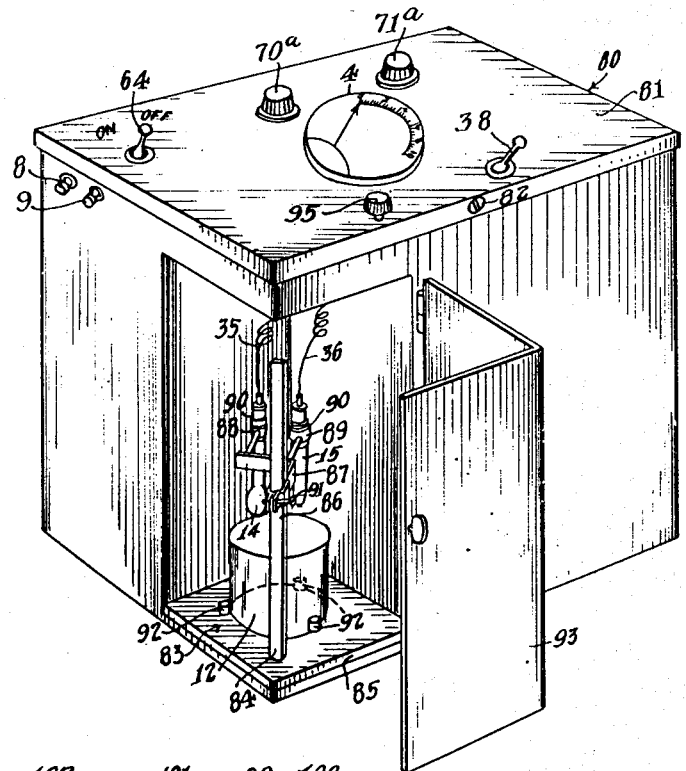
Fig. 3 is a perspective view of the test set which constitutes the essential unit of the invention.

There is shown in Fig. 1 a schematic diagram of a complete apparatus in accordance with the invention for determining the pH of an unknown solution. The apparatus comprises as its main elements a potentiometer 1, a voltaic cell 2, a vacuum tube amplifier 3 and a milliammeter 4.

The potentiometer 1 in itself does not constitute a part of the present invention and may be of any well-known type. Essentially, it is a calibrated source of variable potential and has, therefore, been indicated as comprising a resistance element 5 connected to a battery 6 and having a movable contact 7 which may be shifted along the resistance 5. One end of resistance 5 is connected to an output terminal 8 and the movable contact 7 is connected to another output terminal 9. The movable contact 7 is shown connected to an indicator hand 10 adapted to swing over a scale 11. Potentiometers of this general type are so well-known as to require no further description. The device 1 is essentially a voltage dividing device. When the pointer 7 is at the extreme lower end of resistance 5, no potential is impressed across the output terminals 8 and 9. Likewise when in this position the indicator hand 10 is opposite the zero mark on the scale 11. When the contact 7 is at the extremely upper end of resistance 5, the low potential of the battery 6 is impressed across the output terminals 8 and 9 and the indicator hand 10 will so indicate on the scale 11 the maximum potential. The battery 6 is of such nature that it supplies a very constant potential and may be standardized from time to time by comparison with a standard cell. By shifting the movable contact 7 along the resistance 5, any desired potential between zero and the full potential of the battery 6 may be applied to the output terminals 8 and 9 and the value of this potential may be read on the scale 11.

The voltaic cell 2 is not new with us and may consist of any electrode systems in which the change in potential of the cell is a function of the hydrogen ion concentration. Several such systems are well known in the art including electrodes of the following types: hydrogen, quinhydrone, antimony and glass. The present device is applicable to all such systems, but is especially useful in connection with the glass electrode which inherently has a very high electrical resistance. The potential of this electrode is therefore very difficult to measure accurately by most other means.

A form which we prefer to use is illustrated in detail in Fig. 2. It comprises a beaker or other receptacle 12 adapted to contain the unknown solution, the pH of which is to be determined. The beaker is preferably filled with the unknown solution to the level of the dotted line 13. Suspended within and partly submerged in the solution in the beaker 12 are a pair of electrodes 14 and 15, respectively. Electrode 14 comprises a glass tube 16 having a thin bulb 17 blown on the lower end thereof. The upper end of tube 16 is open and receives a cork 18 which supports a glass tube 19. The tube 19 is open at the top but is closed by a plug 20 a short distance below the top. A platinum ribbon 21 extends through and is sealed in the plug 20. A portion of the tube 19 immediately above the plug 20 is filled with mercury 22 which surrounds and contacts with the upper end of the platinum ribbon 21. The tube 19 is slightly enlarged below the plug 20 and is closed at the bottom but is provided with a small orifice 23 in one side to permit contact between liquid in the bulb 17 and liquid within the lower part of tube 19. The bulb 17 preferably contains a solution of .1 N hydrochloric acid saturated with quinhydrone, although any electrode systems of reproducible potentials would also be satisfactory. The lower portion of the tube 19 is also filled with the same solution and contains in its lower end a few crystals 24 of quinhydrone to maintain the solution saturated at all times.

Electrode 15 comprises a glass tube 25 open at both ends but tapered inwardly at the lower end to constitute a seat portion of frusto-conical shape, in which there rests a frusto-conical plug 26. The juxtaposed surfaces of the tube 25 and the plug 26 are ground to form a close fit and prevent practically all leakage of fluid from the tube 25. However, there is always present a thin film of solution between the surfaces of the plug 26 and the cooperating surface of the tube 25 sufficient to afford ready conduction of current between the solution in the beaker and a solution within the tube 25. The upper end of tube 25 is closed by a cork or plug 27 which supports an inner tube 28 within the tube 25. Tube 28 is similar in construction to tube 19 and comprises an upper chamber containing mercury 29 separated by a wall 30 from a second chamber in the lower portion of the tube. A platinum ribbon 31 is sealed through the plug 30 and contacts with the mercury 29. The lower portion of the ribbon 31 dips into a paste composed of mercury, mercurous chloride and potassium chloride in the bottom of the tube 28. The inner tube 28 and the other tube 25 are filled with a saturated solution of potassium chloride and mercurous chloride, electrolytic connection between the two being provided by an orifice 32 in the wall of the tube 28.

It has been found that a cell of the type described develops a potential between the platinum ribbons 21 and 31 which is a function of the acidity or pH of the solution in which the bulb 17 and the tube 25 are submerged, so that by determining the potential between the platinum ribbons the pH content of the solution can be determined. Although the theory of the glass electrode is still controversial, its operation may be explained upon the basis that only hydrogen ions can pass through the thin glass bulb 17. However, the rate of ionic flow through the bulb is extremely slow so that the current obtainable from the cell is exceedingly slight. Therefore if it is attempted to measure the potential between the ribbons 21 and 31 (as by inserting the terminals of a measuring device into the mercury pools 22 and 29) with a device having a low resistance, the potential drop within the cell is so great that the voltage reading obtained is grossly inaccurate. It is necessary, in order to measure the potential developed by the cell with reasonable accuracy, that the external circuit connected to the electrode have an impedance that is large as compared with the impedance of the glass bulb 17. Since the impedance of the glass bulb may be anywhere between five million and a billion ohms, or even greater, obviously the external circuit must have an enormous resistance. It is thus impracticable to attempt to employ a direct reading voltmeter adapted to be connected directly across the electrodes 14 and 15 but we have found it practicable to measure the potential between the electrodes by connecting them in series with a potentiometer and a vacuum tube voltage indicating device which merely indicates the existence of potential, not its absolute magnitude.

Thus, referring again to Fig. 1, we have shown the electrode 14 connected to an input terminal 35 of the vacuum tube amplifier in the voltage indicating device 3 and the electrode 15 connected to a terminal 36 of the device 3 (all the elements of device 3 being shown as enclosed within the dotted line 37).

Device 3 is provided with a reversing switch 38, one terminal 39 of which is connected directly to terminal 36 and the other terminal 40 of which constitutes the other input terminal of the vacuum tube amplifier. The other two terminals on reversing switch 38 are connected directly to binding posts 8 and 9 on the unit 3, which are adapted to be connected to the potentiometer 1. It will be seen, therefore, that the cell 2 is connected in series with the potentiometer 1 and by proper positioning of the reversing switch 38 the potentials of the potentiometer and the cell can be made to oppose each other, whereby the resultant potential applied to the vacuum tube amplifier will be the difference between the potentials of the potentiometer and the cell.

When the potentiometer potential is adjusted to exactly equal the cell potential, and the switch 38 is so positioned that the two potentials oppose each other, the potential applied to the amplifier input terminals will be zero. Therefore, the procedure followed in making a test is to adjust the potentiometer until the potential applied to the amplifier input terminals is zero (as indicated by the reading of the milliammeter 4 in the output circuit of the amplifier).

Obviously, if the input circuit of the amplifier has a resistance low enough to draw any measurable current from the potentiometer 1, or the cell 2, the latter, because of its extremely high internal resistance, will not display its true potential at terminals 35 and 36, and an accurate test will not be obtained.

Furthermore, if at any time during the operation, any appreciable current passes through the voltaic cell 2, polarization will take place at the electrode, producing a drift in the readings and possibly a serious error in the measurement unless sufficient time is allowed for the polarization effects to disappear. The present invention was designed to eliminate these difficulties by providing an extremely high input resistance.

The amplifier construction whereby a high input resistance is obtained together with numerous other advantageous features, will now be described. The amplifier comprises an input or first-stage tube 50 and an output tube 51. Tube 50 is preferably a screen grid, identified commercially as a type 32 tube and ordinarily used as a radio frequency amplifier in radio receiving sets. It has an oxide-coated filamentary cathode 52 requiring a current of 60 milliamperes for normal energization, a control grid 53, a screen grid 54, and an anode 55.

When used as a radio frequency amplifier, the tube is intended to have a positive potential of approximately 135 volts impressed on the anode 55 and a positive potential of approximately 67 volts impressed on the screen grid 54. The control grid 53 is ordinarily given a negative bias of about 3 volts with respect to the cathode 52. The potential across the cathode, when carrying its normal heating current of 60 milliamperes is approximately 2 volts.

The output tube 51 is a triode having an oxide-coated filamentary cathode 56, a control grid 57 and an anode 58. The cathode 56 is normally energized by current of 60 milliamperes at a terminal potential of 2 volts. The anode potential usually employed when the tube is used as a detector or amplifier in a radio set is between 90 and 180 volts and the negative grid bias between 4½ and 13½ volts.

We have found that it is undesirable for the purpose for which we are here concerned to operate these tubes at anywhere near their normal potential, particularly with respect to the input tube 50. Thus we have found that in order to secure an extremely high resistance between the cathode and control grid of this tube (which comprise the input circuit of the device 3) that it is desirable to reduce the current in the cathode to about half the normal value, or 30 milliamperes, to reduce the potential applied to the anode 55 to a few volts and to reduce the potential applied to the screen grid to about 22½ volts. With these low anode and screen grid potentials, a lower biasing potential is required on the control grid 53.

The chief factors which determine the input resistance of a vacuum tube are
(1) electronic flow from the cathode to the control grid;
(2) the currents resulting from the formation of positive ions by collision of the electrons flowing between the cathode and anode with the residual gas molecules within the tube;
(3) the emission of electrons by the grid due to heating thereof by radiation from the other elements of the tube, particularly the cathode, or from molecular bombardment or photoelectric effect;
(4) leakage between the cathode and control grid over the glass wall of the tube, especially through the glass press through which the electrode leads are sealed.

In our amplifier, the flow of electronic current between the cathode and grid is prevented by maintaining the grid negative with respect to the cathode in accordance with established practice. The production of current, due to ionization of gas within the tube by electronic bombardment, is prevented by employing low anode and screen grid potentials, thereby reducing the electronic velocity to a value such that substantially no ionization occurs. The emission of electrons by the grid is prevented by maintaining the cathode at a relatively low temperature. Furthermore, the cathode is of a type that requires so little energy that it radiates a relatively small amount of heat and light under any condition.

The reduction in resistance due to conduction or leakage over the surface of the glass bulb of the tube is reduced to a low value by virtue of the fact that in the type 32 tube employed, the control grid terminal is brought out at the top of the tube, whereas the other leads are brought out through the base of the tube.

The energizing potentials for the tubes are derived from dry batteries. Thus the cathode heating battery 60 comprises two standard dry cells connected in series. The source of anode potential consists of a 22½ volt battery 61 connected in series with a 4½ volt battery 62. The potential for the screen grid 54 is derived directly from the 22½ volt battery 61. A 15-volt battery 63 provides negative bias for the grid 57 of the output tube 51.

The cathodes 52 and 56 of the two tubes are connected in series with the battery 60 through a switch 64 (this switch being used to turn the set "on" and "off"). It is desired to apply substantially normal potential (two volts) to the cathode 56, whereas, as previously mentioned, a current much reduced below normal value is applied to the cathode 52. For this reason a resistor 65 having a resistance of substantially 30 ohms, is shunted across the cathode 52 to reduce the current therein without correspondingly reducing the current in the cathode 56.

In the usual direct-current vacuum tube amplifiers, to maintain sensitivity and stability, it is necessary to do one of three things; (1) provide large batteries which will maintain substantially constant voltage; (2) provide means for automatically compensating for variations in battery voltages; (3) to provide manual adjustments for each battery potential. Large batteries are expensive, heavy and unsuited for portable equipment. Automatic compensating circuits are usually effective only for a small change in battery potentials and are necessarily inefficient, demanding excessively large batteries or frequent battery renewal. Manual adjustments of each battery potential is tedious and unsuited for commercial application, since the adjustment of one potential usually necessitates the adjustment of other potentials to maintain uniform sensitivity. Furthermore, in the hands of an unskilled operator excessive currents caused by improper adjustments may seriously damage the indicating instrument. In the present invention the changes in all battery potentials are compensated by the simple manual control of a single potential, namely, the control grid potential of tube 50. Furthermore, the compensating device is of such design that damage to the instrument cannot result from any manipulation of the adjustment. The same simple device also permits the selection of any desired sensitivity for the instrument.

The control device consists of a network of resistances comprising resistors 66, 67, 68 and 69, connected in shunt to the cathode 56 of the output tube 51. Resistor 67 has a variable tap 70 thereon and the resistor 69 is variable, having a movable tap 71 adapted to be moved over the length of the resistance and permanently connected to one end of the resistance.

It will be observed that the resistance 68 is connected effectively in shunt to that portion of resistance 67 between the tap 70 and the right end of the resistance and that these two are connected in series with the remainder of resistance 67, resistance 66 and resistance 69, across the cathode 56.

It will be observed that the grid 53 of tube 50 is connected directly to the movable contact 72 of a transfer switch 75, having a back contact 73 and a front contact 74. The back contact 73 is connected directly to the movable tap 70 and is also connected to the reversing switch terminal 40 so that when the transfer switch 75 is in normal position with the movable contact 72 closed on the back contact 73, the grid 53 of the first tube is connected to its cathode 52 through the resistance 66, and a portion of resistance 67, the potential drop in these resistances determining the degree of negative potential the grid has with respect to the cathode. When the transfer switch 75 is actuated to shift the movable contact 72 against the front contact 74, the same situation obtains, except that the potentiometer 1 and the cell 2 are inserted in series in the grid circuit. For convenience, the transfer switch 75 should operate very quickly so that the needle of the indicating meter 4 will remain substantially stationary when the switch is operated in either direction. As indicated in Fig. 1, the switch contact 72 must break from one contact before engaging the other contact for each cycle of operation, otherwise there would be a period of time during operation of the switch when the voltaic cell 2 would be connected in a closed circuit of low resistance with the production of harmful polarization effects.

In designing the compensating device, it was found that a controllable variation of 1.5 volts in the potential of grid 53 was sufficient to maintain substantially uniform sensitivity of the circuit even when any or all battery potentials had decreased to as little as ⅔ of their initial value and was also sufficient to compensate for variations in the characteristics of commercial tubes. The adjustment of the potential of grid 53 is effected in the main by rotation of the movable tap 70. However, when the circuit is used in an acidity measuring apparatus, it is required that a change of 0.0001 volt in the potential of the control grid 53 should produce a detectable deflection of the indicating instrument. It is desirable to be able to readily set the negative bias of the control grid 53 to within approximately 0.001 volt. Unfortunately, a suitable small potentiometer adaptable to the requirements of this circuit, which would permit a variation in potential of 1.5 volts in steps of 0.001 volt, is not commercially available. It was necessary therefore to devise in effect a fine adjustment for the coarse potentiometer 67. It is required that the filament currents of the tubes 50 and 51 be unaffected by any manipulation of the controls and that the final adjustment be uniformly effective regardless of the setting of the coarse potentiometer. That is, a given movement of the fine adjustment should impress approximately the same increment of potential on the grid irrespective of whether the movable tap 70 is set at 0, 5,000 ohms, or any intermediary point. By reference to Fig. 1 it will be seen that the combination of the two ordinary type potentiometers 67 and 69 with the resistor 68 functions in the desired manner.

It will be noted that the fixed resistor 66 (approximately 600 ohms) in series with variable elements of the grid control circuit constitutes a valuable safety feature, inasmuch as it maintains at all times a certain minimum negative bias which prevents the input resistance becoming so low as to permit the passage of current through the voltaic cell 2 of sufficient magnitude to produce harmful polarization.

It will be observed that the anode 58 of tube 51 is connected to the positive terminal of the battery 62 so that the maximum positive potential available from batteries 61 and 62 is applied to this tube. The output of the first stage tube 50 is applied to the second tube 51 through the medium of a coupling resistor 78 and the battery 63. Resistor 78 preferably has a very high resistance of the order of 20 megohms, which produces a large drop in the potential applied to the anode 55. However, the average potential of anode 55 is still positive with respect to the cathodes of the tubes, and hence to maintain the grid 57 negative with respect to the cathode 56, the biasing battery 63 is connected between the anode 55 and the grid 57.

The apparatus indicated within the dotted line 37 in Fig. 1 may be conveniently assembled in a compact metal case 80, as shown in Fig. 3. This case is made of metal in the form of a rectangular parallelepiped having a bottom wall and side walls rigidly secured together and a hinged cover 81 which is secured in closed position by a pair of screws 82, one on each side. The side walls are extended inwardly at one corner of the case to provide a recess 83 for receiving a standard 84 which supports the beaker 12 containing the solution to be tested and the electrodes 14 and 15.

The standard 84 comprises a heavy metal base 85 adapted to rest on the floor of the recess 83 and having a supporting rod 86 secured thereto. A clamp 87 is slidably mounted upon the supporting rod 86 and has formed therewith a pair of arms 88 and 89 which support the electrodes 14 and 15. Thus each of the arms 88 and 89 has a ring 90 on its outer end which encloses the stem of the electrode 14 or 15. The clamp 87 is provided with a thumb-screw 91 to permit the clamp to be loosened and slid up and down along the rod 86 to position the electrodes 14 and 15 in the solution to be tested in the beaker 12 or to lift them clear of the solution. The base 85 may also be provided with three pins 92, one of which may be removable, for maintaining the beaker 12 in proper position. The terminals 35 and 36, from which connection is made to the electrodes 14 and 15, may conveniently comprise flexible wires which are connected to the respective electrodes 14 and 15 by simply dipping the ends of the wires into the mercury pools in the upper ends of the electrodes. The recess 83 may be closed by a hinged door 93. This construction of the case 80 with a recess for receiving the test cell, is advantageous not only because of the compact assembly resulting, but because of the fact that the cell and connecting leads are substantially completely electrostatically shielded by the surrounding metal walls. This feature is important because any terminal having such a high impedance to ground as the terminal 35 can have potentials of substantial magnitude induced therein by extraneous electrostatic fields.

Figure 4:
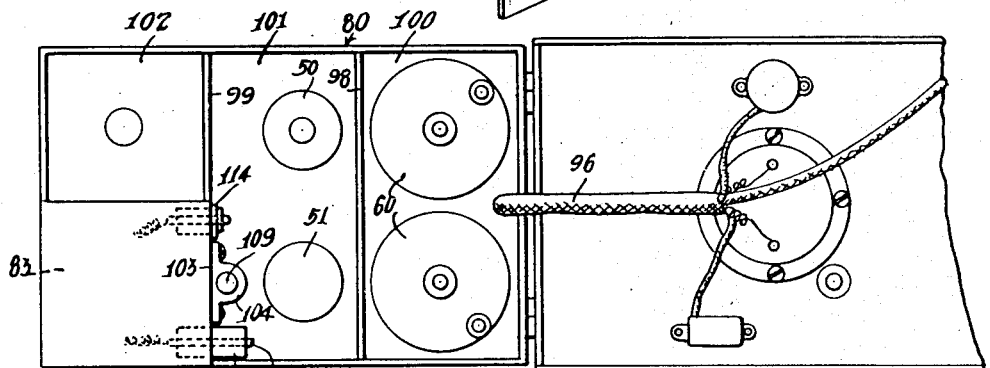
Fig. 4 is a plan view of the unit shown in Fig. 3 with the cover in open position.

A control button 95 for the transfer switch 75, the "on" and "off" switch 64, the variable resistance elements 67 and 69, and the reversing switch 38 are all mounted in the hinged cover plate 81, and, as shown in Fig. 4, connections from these various elements to the remaining apparatus are effected through a flexible cable 96.

Referring to Fig. 4, it will be observed that the interior of the case 80 is divided by a partition 98 and a partition 99 into three compartments 100, 101, and 102. The compartment 100 contains two standard dry cells which constitute the battery 60 for energizing the cathodes of the vacuum tubes. The compartment 101 contains the vacuum tubes 50 and 51, respectively, these tubes being mounted in sockets positioned on the floor of the cabinet and extending vertically. The compartment 102 contains the batteries 61, 62 and 63 which, as previously indicated, are compact multicell dry batteries of the type commonly termed "C" batteries and sold extensively for providing biasing potentials in radio and amplifying circuits.

To simplify the drawings, various small apparatus details have been omitted, and the wiring connections have been omitted from Fig. 4. However, the resistors 65, 78, 66 and 68 may be mounted in compartment 101, being relatively small, and occupying little space.

The transfer switch 75 is mounted upon a portion 103 of the side wall of the case which separates the compartment 101 from the recess 83 in which the cell to be tested is positioned.

Figure 5:
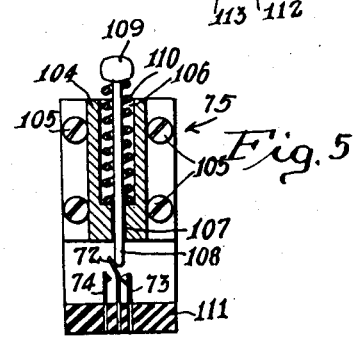
Fig. 5 is a detailed sectional view showing the construction of one of the switches employed in the apparatus shown in Figures 3 and 4.

Referring to the sectional view of Fig. 5, this switch comprises a metal casing 104 secured to the wall 103, as by screws 105, and having a relatively large passage 106 extending downward therethrough, which passage terminates at the lower end in a smaller passage 107 extending through the bottom of the member 104. A glass rod 108 extends down through the openings 106 and 107, having a sliding fit in the smaller lower opening 107. The rod 108 is provided with a head 109 on its upper end and is normally maintained in a desired uppermost position by a helical spring 110 which surrounds the rod 108 and is adapted to be compressed between the lower end wall of the upper passage 106 and the underside of the head 109. Positioned below the rod 108 are the switch contacts 74, 72 and 73, these contacts being insulatingly supported in a block 111 of highly insulating material. The lower end of the rod 108 normally rests against the inclined upper end of the contact 72, contact 72 normally being in the position shown in Fig. 5 in which it is closed on the back contact 73. Downward movement of the rod 108 deflects the movable contact 72 to the left, disconnecting it from the contact 73 and connecting it to the contact 74. The push button 95, mounted in the cover 81, is so positioned as to register with the head 109 on the glass rod 108 when the cover is in closed position, so that the transfer switch may be actuated by the mere depressing of the button 95.

As previously indicated, it is very important to maintain that portion of the circuit adjacent the grid 53 of the input tube 50 exceptionally well insulated with respect to ground.

It will be observed from Fig. 1 that the grid 53 is connected directly to the movable contact 72. This contact is well insulated and is protected from body capacity effects during operation by the fact that it is actuated through the relatively long glass rod 108 having an extremely high impedance and low capacity between its opposite ends because of its relatively great length. The contact 74 and the leads associated therewith must also be very well insulated. This contact, it will be observed in Fig. 1, is connected directly to the terminal 35 which makes connection with the cell to be tested. It is therefore necessary to complete a connection through the metal wall of the case. This is effected without sacrificing high insulation by employing a connecting lead 112 extending between contacts 74 and the flexible wire 35 and surrounding this lead 112 at its point through the middle wall of the case with a heavy glass bushing 113, the bushing extending along the lead 112 for a substantial distance on each side of the metal wall. The terminal wire 36, which connects the electrode 15 of the cell to the reversing switch 38, is at a relatively low potential with respect to ground and need not be so carefully insulated. It is therefore extended through the walls of the case through a simple rubber or bakelite bushing 114.

The device is operated as follows:

The standard 84 is removed from the recess 83, the clamp 87 raised along the rod 86 to carry the electrodes clear of the beaker 12 and the solution to be tested inserted in the beaker. Thereafter the electrodes 14 and 15 are lowered into the solution and the standard 84 replaced in the recess 83 and connection to the electrodes completed by inserting the ends of the wires 35 and 36 into the mercury pools in the upper ends of the two electrodes. The cover 93 may then be closed to completely electrostatically shield the cell and the connecting leads thereto. A potentiometer is then connected to the binding posts 8 and 9 on the exterior of the case 80 and the amplifier is then energized by turning the switch 64 into "on" position. The cathodes of the tubes heat in a relatively few seconds and in less than a minute the milliammeter 4 will show a steady reading. The current through the milliammeter may be adjusted to bring the needle to a desired region on the scale of the meter by turning first the coarse adjustment knob 70a to the right or left as required and then turning the fine adjustment knob 71a which, as before mentioned, permits the selection of the desired sensitivity of the instrument.

During the preceding operations, of course, the button 95 has not been touched and therefore contact 72 has remained against its back contact 73, connecting the grid 53 of the first tube to the cathode of the tube through the negative biasing resistance, no more potentials existing in the grid circuit. It is apparent, therefore, that if now contact lever 72 be moved from contact 73 to contact 74, the same milliammeter reading will obtain only when there is zero potential difference between the terminals 35 and 40; that is, according to Fig. 1, when the potential of the voltaic cell 2 is exactly equal and of opposite polarity to the potential impressed across the terminals 39 and 40 by the potentiometer system 1.

The next step in the operation is to adjust the potentiometer 1 connected to the terminals 8 and 9 until the same milliammeter reading is obtained when the button 95 is in either the normal or depressed position. It may be necessary to operate the reversing switch 38 to properly pole the potentiometer 1 with the voltaic cell 2.

When the milliammeter indicates that a balance has been obtained, the reading of the pentiometer is taken, that reading giving accurately the potential of the cell 2, which is a measure of the acidity of the solution being tested.

An amplifier constructed as described affords sufficient amplification to give an indication on a milliammeter having a range of 0 to 1 milliampere of about 1 millimeter deflection of the needle for a change of one millivolt in the input potential to the grid circuit of tube 50. In terms of acidity, this means that the apparatus will detect a change in acidity of less than 0.01 pH unit, which is many times the sensitivity necessary for most applications. It is important to note that the capacity of the measuring circuit is so low, by virtue of the screen grid tube 50, and the resistance is so high that sufficient current cannot pass through the cell to appreciably affect the potential of the cell, even before the balance condition has been obtained. This is very essential for the highest accuracy of measurement with the glass electrode.

The device is rugged mechanically because it has no delicate elements therein. The most sensitive element in the apparatus is the milliammeter 4 and that is relatively rugged and cannot be thrown out of order by ordinary handling. The set is also electrically rugged inasmuch as it is impossible to actuate it in any manner to cause a current in excess of 1 milliampere to flow through the milliammeter. This result is due to the non-linearity of the characteristic curve of output or anode current versus input grid potential. This curve possesses a short region of maximum slope and when the amplifier is operated within this region maximum sensitivity is obtained. When the grid potential is adjusted to either side of this region, the sensitivity decreases and the decrease is accelerated as the grid potential moves further from this region. In the limiting cases, as the grid potential becomes increasingly positive, the anode current of output tube 51 decreases and as the grid potential becomes increasingly negative the anode current of tube 51 increases. However, as a result of the low anode voltage (27 volts) of output tube 51 the space current is limited to 1 milliampere and the output current cannot exceed this value, even though a relatively large negative grid potential be applied to the first tube. It is obvious that the control of the input grid potential, by means of knobs 70a and 71a, provides a convenient rapid means for selecting the desired sensitivity of the instrument. Furthermore, the current-limiting feature described constitutes a valuable protective feature inasmuch as it is impossible to damage the meter 4 by excessive currents either through careless operation or through the application of excessive potentials to the input terminals 35 and 40.

It is apparent from the preceding description that the circuit described constitutes a non-linear amplifier which is ideally suited for the purposes intended. It provides a measuring device of high sensitivity and great stability, yet which automatically protects the delicate voltaic cell from harmful polarization effects and also protects the indicating instrument by automatically preventing currents in excess of its rating. Microphonic effects which usually accompany high sensitivity vacuum tube amplifiers are noticeably absent in the present invention. This constitutes another valuable feature inasmuch as it permits the use of the device in many places, such as factories, where vibration precludes the use of galvanometers and other delicate instruments.

The apparatus has the advantage of being relatively inexpensive to manufacture, because all of the elements are more or less standard and can be purchased in the open market at low cost. Thus the type of tubes employed may be obtained from almost any radio supply house, likewise the batteries, resistances, etc., that are employed.

The apparatus also has a very low maintenance expense. Because of the low current consumption of the tubes employed, the dry cells constituting the battery 60 have a life of many months in ordinary use and are relatively inexpensive to replace. The current drain on the remaining batteries is so low that their life in the apparatus is substantially equal to their shelf life. Furthermore, it has been found that the apparatus can be used with almost no reduction in sensitivity or stability even when the battery potentials have dropped to ⅔ their initial value, the only compensation necessary for the reduced potentials being obtained by adjusting the grid potential of the tube 50.

It should be noted that the glass electrode and calomel electrode assemblies have been shown relatively large in the drawings for the sake of clarity. Actually, electrodes have been used which had active surfaces of only a few square millimeters and required only a drop of solution therebetween as the electrolyte.

Having fully described the preferred embodiment of this invention, it is to be understood that we do not limit ourselves to the exact construction herein set forth, which may obviously be varied in detail without departing from the spirit of this invention, but only as set forth in the appended claims.

We claim:

1. A testing unit for indicating potential comprising a reference circuit, a vacuum tube amplifier having input and output circuits, an indicating meter in said output circuit, and means for alternately connecting said input circuit to said reference circuit and a circuit to be tested, in which the anode potential applied to at least one vacuum tube in said amplifier is so adjusted that its maximum space current is limited to a value less than that necessary to produce full scale deflection of said meter, whereby overload damage to the meter is rendered impossible irrespective of the potential applied to said unit from a circuit to be tested.

2. A testing unit for indicating potential, said unit comprising an input vacuum tube, and an output vacuum tube coupled thereto, each tube having a cathode, a grid and an anode, said unit also comprising dry batteries including a B battery for supplying positive potential to the anodes of the tubes, an A battery for heating the cathodes of the tubes and a C battery for supplying negative bias to the grid of the output tube, means for indicating the magnitude of the anode current in the output tube, means for supplying a negative biasing potential for the grid of said input tube, and means for alternately applying said biasing potential directly to the grid of said input tube and to the grid through a circuit to be tested; in which the cathodes of the two tubes are connected in series across the A battery, and in which the means for supplying negative biasing potential to the grid of the input tube comprises resistance means having a variable tap thereon shunted across the cathode of the output tube and in which a fixed resistor is shunted across the cathode of the input tube for limiting the current supplied to the cathode of the input tube by the A battery, and means for varying the grid biasing potential of said input tube of such nature that the sensitivity of control is substantially constant over its entire range.

3. In a testing unit for indicating potential, a pair of vacuum tubes connected in cascade and adapted to be energized from dry cells, each of said tubes having a cathode, a control grid and an anode, a cathode heating battery, a grid biasing battery and a space current battery, circuit means including a control switch for connecting the cathodes of said tubes in series with each other and with said cathode heating battery, the cathode of the first tube being adjacent the positive terminal of said battery, a coupling resistor and circuit means for connecting it in series with said space current battery between the cathodes of said tubes and the anode of said first tube, circuit means for connecting the anode of said first tube to the grid of said second tube through said grid biasing battery, a meter and circuit means for connecting it in series with said space current battery between the cathode and anode of said second tube, a pair of input terminals, and means for connecting one of said terminals to the grid of said first tube, a first, fixed resistance connected at one end to the negative end of the cathode of said first tube, a second, fixed resistance having a variable tap thereon and connected at one end to the other end of said first fixed resistance, a third, variable resistance connecting the other end of said second resistance to the negative terminal of said cathode heating battery, and a fourth, fixed resistance connecting the tap on said second resistance to the said other end of said second resistance, said tap being also connected to the other of said pair of input terminals.

4. A testing unit for use in connection with a potentiometer for measuring the potential of voltaic cells, comprising a closed metal case having an exterior wall, a portion of which is reentrant to constitute a recess for receiving a voltaic cell to be measured whereby the cell is in part at least electrostatically shielded by the fixed wall of said case, movable, metal, cover means for covering said recess, thereby completely shielding said cell, said case containing therein a vacuum tube amplifier consisting of a series of vacuum tubes connected in cascade and said case also containing dry cells for energizing said tubes, a meter connected in the output circuit of the last stage vacuum tube in said amplifier, said meter having its dial exposed through said casing, a transfer switch comprising a movable contract, a back contact and a front contact, said movable contact being connected to the grid of the first tube in said amplifier and said back contact being connected to the cathode of said first tube, means comprising a conductor extending through the reentrant wall of said casing for connecting the said front contact to one electrode of the voltaic cell to be measured, means for insulating said conductor from said wall comprising an insulating bushing surrounding said conductor at its point of passage through said wall, a reversing switch in said case having a pair of input terminals and a pair of output terminals, one of said input terminals being connected to said front contact, and means for connecting said other input terminal to the other electrode of the voltaic cell to be measured, said means comprising a conductor extending through an insulating bushing in the reentrant portion of said wall, and means for completing connection from said reversing switch to said potentiometer.

5. A portable testing unit for use in connection with a potentiometer for measuring the potential of extremely high resistance voltaic cells, comprising a closed metal case containing therein a vacuum tube amplifier comprising a series of vacuum tubes connected in cascade, said case also containing dry cells for energizing said tubes, a meter connected in the output circuit of the last stage vacuum tube in said amplifier, said meter having a dial exposed through said casing, a transfer switch comprising a movable contact, a back contact and a front contact, said movable contact being connected to the grid of the first tube in said amplifier and said back contact being connected to the cathode of said first tube, said movable and back contact being so supported as to have an extremely high resistance to ground with actuating means comprising an insulating plunger of substantial length extending from said movable contact to the exterior of said case for manual actuation of said movable contact without appreciably reducing its resistance to ground or increasing its capacity to ground, means comprising a conductor extending through the wall of said casing for connecting the said front contact to one electrode of the voltaic cell to be measured, means for insulating said conductor from said wall, comprising an insulating bushing surrounding said conductor at its point of passage through said side wall, a reversing switch in said case having a pair of input terminals and a pair of output terminals, one of said input terminals being connected to said front contact, and means for connecting said other input terminal to the other electrode of the voltaic cell to be measured, said means comprising a conductor extending through an insulating bushing in the reentrant portion of said wall, and means for completing connection from said reversing switch to said potentiometer.

6. A testing unit for use in connection with a potentiometer for measuring the potential of voltaic cells, comprising a closed metal case containing therein a vacuum tube amplifier comprising a series of vacuum tubes appropriately connected in cascade, said case also containing dry cells for energizing said tubes, a meter connected in the output circuit of the last stage vacuum tube in said amplifier, said meter having a dial exposed through said casing, a transfer switch comprising a movable contact, a back contact and a front contact, said movable contact being connected to the grid of the first tube in said amplifier and said back contact being connected to the cathode of said first tube, means comprising a conductor extending through the wall of said casing for connecting the said front contact to one electrode of the voltaic cell to be measured, means for insulating said conductor from said wall, comprising an insulating bushing surrounding said conductor at its point of passage through said side wall, a reversing switch in said case having a pair of input terminals and a pair of output terminals, one of said input terminals being connected to said front contact, and means for connecting said other input terminal to the other electrode of the voltaic cell to be measured, said means comprising a conductor extending through an insulating bushing in the reentrant portion of said wall, and means for completing the connection from said reversing switch to said potentiometer.

7. In a potential indicating device comprising a vacuum tube amplifier having input terminals adapted to be connected to the source of potential to be indicated, and having an output circuit containing a current indicating instrument in combination with means for supplying anode potential to said amplifier of such magnitude relative to the characteristics of the amplifier that the maximum output current of said amplifier is less than the maximum safe current capacity of said indicating instrument.

8. A system for controlling the sensitivity of and compensating for battery voltage variation in a battery energized vacuum tube amplifier consisting of a resistance network connected in series with the cathode of the first vacuum tube and the battery for energizing said cathode, said network including a first fixed resistor of relatively high resistance, having a movable tap thereon, a second variable resistor of relatively low resistance connected in series with said first resistor, a third, fixed resistor connected between the said movable tap of the first resistor and the junction of said first and second resistors, means connecting the other end of said first resistor to one side of the cathode of said first tube, the other end of the second resistor being connected through said battery to the other side of said cathode, and means for connecting said movable tap on said first resistor to the control grid of said first vacuum tube.

9. A testing unit for use in connection with a potentiometer for measuring the potential of voltaic cells comprising a vacuum tube amplifier having input and output circuits and consisting of a plurality of vacuum tubes connected in cascade, dry batteries for energizing said tubes, a case enclosing said amplifier and adapted to electrostatically shield at least the grid circuit of the first tube of the amplifier, a meter connected in the output circuit of the amplifier, a transfer switch electrostatically shielded by said case and comprising a movable contact, a back contact and a front contact, means connecting said movable contact to the grid of the first tube in said amplifier, and means including a source of biasing potential connecting said back contact to the cathode of said first tube, means comprising an insulated conductor extending through the wall of said casing for connecting the front contact to one electrode of the cell to be measured, means for connecting the other electrode of the cell to be measured to one terminal of a potentiometer, and means for connecting the back contact of said transfer switch to the other terminal of the potentiometer.

10. In a direct current amplifier, a first vacuum tube and a second vacuum tube, each having a filament, grid and anode, a battery, said filaments being connected in series with each other and said battery, means for supplying potential to the anodes of said tubes, means for coupling the output of said first tube to the input of said second tube, resistance means connected in shunt to the filament of said first tube for reducing the current in that filament to a value such that its electron emission varies substantially with variations in the current therethrough, and resistance means in the filament circuit of said tubes for deriving a biasing potential for the grid of said first tube, which biasing potential varies in response to variations in battery potential in such direction as to oppose the effects on the anode current of the emission variations in the filament caused by said battery potential variations.

ARNOLD O. BECKMAN.
HENRY E. FRACKER.